(12) United States Patent
Ripley (10) Patent No.: US 10,177,838 B2
(45) Date of Patent: Jan. 8, 2019

(54) SHARED INTEGRATED DC-DC SUPPLY REGULATOR

(71) Applicant: Skyworks Solutions, Inc., Woburn, MA (US)

(72) Inventor: David Steven Ripley, Marion, IA (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 0 days.

(21) Appl. No.: 14/868,949

(22) Filed: Sep. 29, 2015

(65) Prior Publication Data
US 2016/0094254 A1    Mar. 31, 2016

Related U.S. Application Data

(60) Provisional application No. 62/057,467, filed on Sep. 30, 2014.

(51) Int. Cl.
*H04B 1/04* (2006.01)
*H04B 7/26* (2006.01)
*H04B 1/16* (2006.01)

(52) U.S. Cl.
CPC ............ *H04B 7/26* (2013.01); *H04B 1/0475* (2013.01); *H04B 1/1607* (2013.01); *H04B 2001/0416* (2013.01); *Y02D 70/122* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/40* (2018.01); *Y02D 70/449* (2018.01)

(58) Field of Classification Search
CPC ............... H04B 1/44; H04B 1/0475; H04B 2001/0425; H04B 17/102; H04B 17/13; H04B 17/18; H04B 17/309; H04B 1/0075; H04B 1/0483; H04B 1/30
USPC .................................................. 455/114.3
See application file for complete search history.

(56) References Cited

U.S. PATENT DOCUMENTS

| 8,255,009 B2 * | 8/2012 | Sorensen ............. H03F 1/0216 455/127.2 |
| 2003/0107440 A1 * | 6/2003 | Miki ..................... H03F 1/0211 330/297 |
| 2005/0079851 A1 * | 4/2005 | Derbyshire ............ H01L 23/66 455/333 |
| 2011/0299632 A1 * | 12/2011 | Mirzaei .................. H04B 1/006 375/340 |

(Continued)

*Primary Examiner* — Ajibola Akinyemi
(74) *Attorney, Agent, or Firm* — Knobbe, Martens, Olson & Bear, LLP (57) ABSTRACT

The systems and processes described herein can reduce the footprint of the internal devices of a wireless device by combining the DC-DC supply regulator with a FEM. Further, the device footprint can be further reduced by sharing the integrated DC-DC supply regulator among multiple FEMs reducing or eliminating the use of a separate DC-DC supply regulator for each FEM of a wireless device. Moreover, in certain embodiments, by integrating the DC-DC supply regulator into a 2G FEM, power efficiency can be improved for some wireless devices. For example, the DC-DC supply regulator may be used to supply power to a PA used for high-band 2G transmission functions. Using the DC-DC supply regulator can improve power efficiency compared to systems that supply the power for the high-band 2G PA directly from the power supply (e.g., the battery).

18 Claims, 6 Drawing Sheets

(56) References Cited

U.S. PATENT DOCUMENTS

2013/0106508 A1\* 5/2013 Khlat .................... H03F 3/2171
330/127
2014/0087671 A1\* 3/2014 Mostov ................ H03F 1/0227
455/78

\* cited by examiner

SHARED INTEGRATED DC-DC SUPPLY REGULATOR

RELATED APPLICATIONS

This disclosure claims priority to U.S. Provisional Application No. 62/057,467, which was filed on Sep. 30, 2014 and is titled "SHARED INTEGRATED DC-DC SUPPLY REGULATOR," the disclosure of which is expressly incorporated by reference herein in its entirety.

BACKGROUND

Technical Field

The disclosed technology relates to DC-DC supply regulators and, in particular, to DC-to-DC supply regulators for supporting power amplifier operation.

Description of Related Technology

One type of device that converts one direct current ("DC") voltage level to another DC voltage level may be referred to as a DC-to-DC supply regulator or DC-to-DC converter (DC-DC converter). DC-DC converters can be included in battery-operated devices such as mobile telephones, laptop computers, etc., in which the various subsystems of the device require several discrete voltage levels. In some types of devices, such as a mobile telephone that operates in a number of different modes, it can be desirable to supply certain elements, such as power amplifiers, with a supply voltage at a more efficient level for the mode of operation, rather than waste power and accordingly drain the battery prematurely. In such devices, it can be desirable to employ a DC-DC converter that can generate a number of discrete voltage levels.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

SUMMARY

One aspect of this disclosure relates to a front-end module (FEM) of a wireless device. The FEM may include a first power amplifier and an integrated DC-DC supply regulator. The integrated DC-DC supply regulator may regulate a first supply voltage provided to the first power amplifier. Further, the integrated DC-DC supply regulator may regulate a second supply voltage provided to a second power amplifier that is external to the FEM.

In certain embodiments, the second power amplifier is included in a different FEM. The FEM may be configured for 2G communication. However, in some cases, the different FEM that includes the second power amplifier may be configured for non-2G communication.

Further, the FEM may include a switch configured to supply a signal from one of the first power amplifier and the second power amplifier to an antenna. In addition, the FEM may include a third power amplifier that is configured to provide low band 2G communication. In contrast, the first power amplifier may be configured to provide high band 2G communication. In some cases, the third power amplifier receives a third supply voltage from a power source. This third supply voltage may be received directly, or indirectly, from the power source instead of from the integrated DC-DC supply regulator.

In some implementations, the integrated DC-DC supply regulator regulates the first supply voltage and the second supply voltage based on a voltage received from a power source. Further, the integrated DC-DC supply regulator may be combined with a bias circuit. This bias circuit can supply a bias current to the first power amplifier. Moreover, the integrated DC-DC supply regulator can include a capacitor and an inductor that are external to the FEM. Thus, in certain embodiments, the integrated DC-DC supply regulator may be partially integrated with the FEM and partially external to the FEM. With some implementations, the FEM may further include one or more impedance matching networks configured to match an impedance value of the first power amplifier to an impedance value of an antenna.

Another aspect of this disclosure relates to a multi-chip module (MCM). The MCM may include a first front-end module (FEM) that can include a first power amplifier and an integrated DC-DC supply regulator configured to regulate a first supply voltage provided to the first power amplifier. Further, the MCM may include a second FEM that can include a second power amplifier. The second power amplifier may be configured to receive a second supply voltage from the integrated DC-DC supply regulator.

In some embodiments, the first FEM is configured for 2G communication and the second FEM is configured for non-2G communication. In addition, the first FEM may further include a switch configured to supply a signal from one of the first power amplifier and the second power amplifier to an antenna. Moreover, the first FEM may include a third power amplifier. In some such cases, the first power amplifier may be configured to provide high band 2G communication and the third power amplifier may be configured to provide low band 2G communication. Furthermore, the third power amplifier may receive a supply voltage from a source other than the integrated DC-DC supply regulator.

In some designs, the integrated DC-DC supply regulator may regulate the first supply voltage and the second supply voltage based on a voltage received from a power source. Further, the integrated DC-DC supply regulator may be combined with a bias circuit. This bias circuit may be configured to supply a bias current to the first power amplifier. In addition, the MCM may further include a capacitor and an inductor external to the first FEM. The capacitor and the inductor may both be part of the integrated DC-DC supply regulator of the first FEM.

In yet another aspect of this disclosure, a wireless device is disclosed. The wireless device may include an antenna configured to provide a signal and/or receive a signal from a multi-chip module (MCM). Further, the wireless device may include the MCM. This MCM may include a first front-end module (FEM) and a second FEM. The first FEM may include a first power amplifier and an integrated DC-DC supply regulator configured to regulate a first supply voltage provided to the first power amplifier. The second FEM may include a second power amplifier that may be configured to receive a second supply voltage from the integrated DC-DC supply regulator.

In some cases, the first FEM is configured for 2G communication and the second FEM is configured for non-2G communication. In addition, the first FEM may further include a switch configured to supply a signal from one of the first power amplifier and the second power amplifier to the antenna. Further, the first FEM may include a third power amplifier. The first power amplifier may be configured to provide high band 2G communication and the third power amplifier may be configured to provide low band 2G communication. Moreover, the third power amplifier can receive a supply voltage from a source other than the integrated DC-DC supply regulator.

The wireless device may further include a power source and the integrated DC-DC supply regulator may be further configured to regulate the first supply voltage and the second supply voltage based on a voltage received from the power source. Further, the integrated DC-DC supply regulator may be combined with a bias circuit. This bias circuit may be configured to supply a bias current to the first power amplifier. In addition, the MCM may further include a capacitor and an inductor that is external to the first FEM. This capacitor and the inductor may be part of the integrated DC-DC supply regulator of the first FEM.

DETAILED DESCRIPTION

Typically, an electronic device will include a number of power amplifiers. Wireless devices are no exception. Often, a wireless device will include a number of power amplifiers that are included in one or more front-end modules (FEMs). Further, the wireless device may include one or more additional components that support the power amplifier. For example, the wireless device will often include a number of matching circuits that match various elements of the FEM to an impedance of the antenna, which is typically designed to be 50 Ohms. As a second example, the wireless device may include a number of bias circuits for biasing the power amplifiers. As a third example, the wireless device may include one or more DC-DC supply regulators for modifying a voltage level and/or current level supplied to a power amplifier.

Each of the various components described in the previous paragraph add to the size of the wireless device. There is typically an inherent tension between including additional features in a wireless device and reducing the size and weight of the wireless device. This inherent tension is exacerbated by the desire to extend battery life without increasing the size of the battery, which typically accounts for a significant percentage of the weight of the wireless device.

Advantageously, embodiments described herein eliminate die content, resulting in a smaller device footprint, while maintaining or increasing power efficiency. The systems and processes described herein can reduce the footprint of the internal devices of a wireless device by combining the DC-DC supply regulator with a FEM. Further, the device footprint can be further reduced by sharing the integrated DC-DC supply regulator among multiple FEMs reducing or eliminating the use of a separate DC-DC supply regulator for each FEM of a wireless device. Moreover, in certain embodiments, by integrating the DC-DC supply regulator into a 2G FEM, power efficiency can be improved for some wireless devices. For example, the DC-DC supply regulator may be used to supply power to a PA used for high-band 2G transmission functions. Using the DC-DC supply regulator can improve power efficiency compared to systems that supply the power for the high-band 2G PA directly from the power supply (e.g., the battery).

Example Wireless Device

Figure 1A:
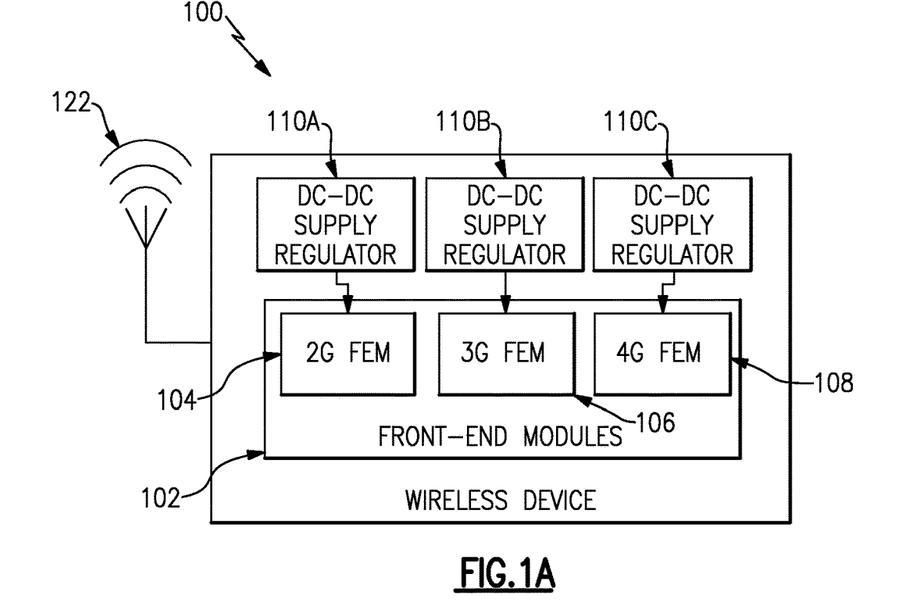
FIG. 1A illustrates a block diagram of an embodiment of a wireless device with a number of front-end modules that are each associated with a separate DC-DC supply regulator.

FIG. 1A illustrates a block diagram of an embodiment of a simplified wireless device 100 with a number of front-end modules 102 that each electrically communicate with a DC-DC supply regulator 110, which may also be referred to as a DC-DC converter circuit. The front-end modules 102 can include a number of FEMs for facilitating signal transmission across a set of communication bands using a number of communications standards or technologies. Often, the communication standards or technologies are identified by generation or version. For example, a large percentage of the world uses second generation wireless telephone technology for transmitting voice calls. This technology is typically referred to as 2G or 2-G. Other communications standards include 2.5G, 3G, 4G, 4G LTE, 5G, WiMAX, GSM, CDMA, etc.

As illustrated in FIG. 1A, the front-end modules 102 may include a 2G FEM 104, a 3G FEM 106, and a 4G FEM 108. Each of the FEMs 102 may facilitate transmission of a communications signal via the antenna 122. Further, at least some of the FEMs 102 may transmit using a different technology and/or over a different frequency band. The FEMs 102 may each receive power from a DC-DC supply regulator 110. For example, the 2G FEM 104 may receive power from the DC-DC supply regulator 110A, the 3G FEM 106 may receive power from the DC-DC supply regulator 110B, and the 4G FEM 108 may receive power from the DC-DC supply regulator 110C. To simplify discussion, and not to limit the disclosure, the DC-DC supply regulators 110A, 110B, and 110C may be referred to as a DC-DC supply regulator 110, in the singular or the plural. In some embodiments, the DC-DC supply regulator 110A may be omitted. In such embodiments, the 2G FEM 104 may receive power directly from a power source (e.g., a battery).

Typically, as illustrated in FIG. 1A, each FEM 102 may be powered by its own DC-DC supply regulator 110. Further, although not shown, each DC-DC supply regulator 110 may be in electrical communication with its own inductor and capacitor. Thus, the more wireless technologies or standards that may be supported by a given wireless device, the more space that may be allocated to DC-DC supply regulators 110.

Further, in some embodiments, one or more of the FEMs, such as the 2G FEM 104, may support multiple bands. For instance, the 2G FEM 104 may support a low band and a high band mode. Often, the low band supporting devices (e.g., a low band PA) in the 2G FEM 104 are powered directly by the battery, or other power supply. Although the high band supporting devices (e.g., a high band PA) may be powered via a DC-DC supply regulator, often the die that includes the 2G FEM includes a single supply pin. Thus, in such cases, the high band supporting devices are also powered directly by the power supply, which can result in a reduced power efficiency compared to a system that enables the high band supporting devices to be powered via the DC-DC supply regulator 110A.

Figure 1B:
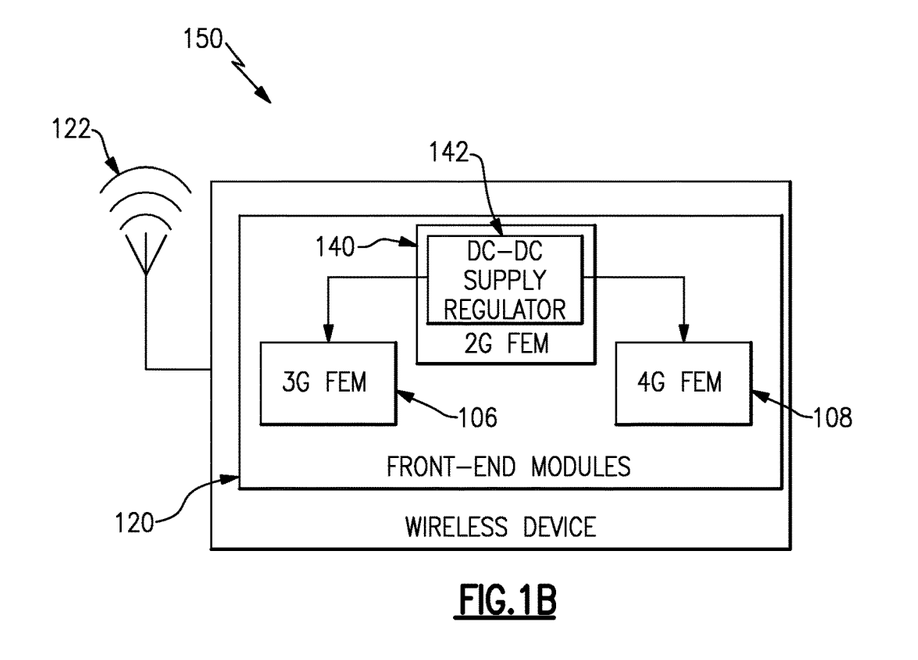
FIG. 1B illustrates a block diagram of an embodiment of a wireless device with a number of front-end modules that share an integrated DC-DC supply regulator.

As discussed in more detail below, embodiments disclosed herein reduce the footprint of the wireless communication system by integrating the DC-DC supply regulator within an FEM and sharing the integrated DC-DC supply regulator between the FEMs of the wireless device, as illustrated in FIG. 1B. Further, in some embodiments, by integrating the DC-DC supply regulator into an FEM that supports multiple bands, power efficiency can be improved by enabling high band (e.g., 1800-1900 MHz) supporting components to be powered via the DC-DC supply regulator while low band (e.g., 800-900 MHz) supporting components are powered directly by the power supply (e.g., a battery).

FIG. 1B illustrates a block diagram of an embodiment of a wireless device 150 with a number of front-end modules 120 that share an integrated DC-DC supply regulator 142. As with the wireless device 100, the FEMs 120 of the wireless device 150 can include multiples FEMs. For instance, the illustrated example includes 2G FEM 140, 3G FEM 106, 4G FEM 108. However, unlike the FEMs 102 of FIG. 1A, the FEMs 120 share a DC-DC supply regulator 142, which can be integrated into the 2G FEM 140.

Although the DC-DC supply regulator 142 is integrated into the 2G FEM 140 in the illustrated example, it should be understood that the DC-DC supply regulator could alternatively be integrated into a different FEM, such as the 3G FEM 106. Further, although the wireless device 150 includes one DC-DC supply regulator 142 that is shared among each of the FEMs 120, it should be understood that the FEMs 120 can include multiple DC-DC supply regulators with at least one of the DC-DC supply regulators being shared among at least two FEMs. For instance, the 2G FEM 140 may include its own DC-DC supply regulator, while the 3G FEM 106 may include a separate DC-DC supply regulator that it shares with the 4G FEM 108.

Example Multi-Chip Module

Figure 2:
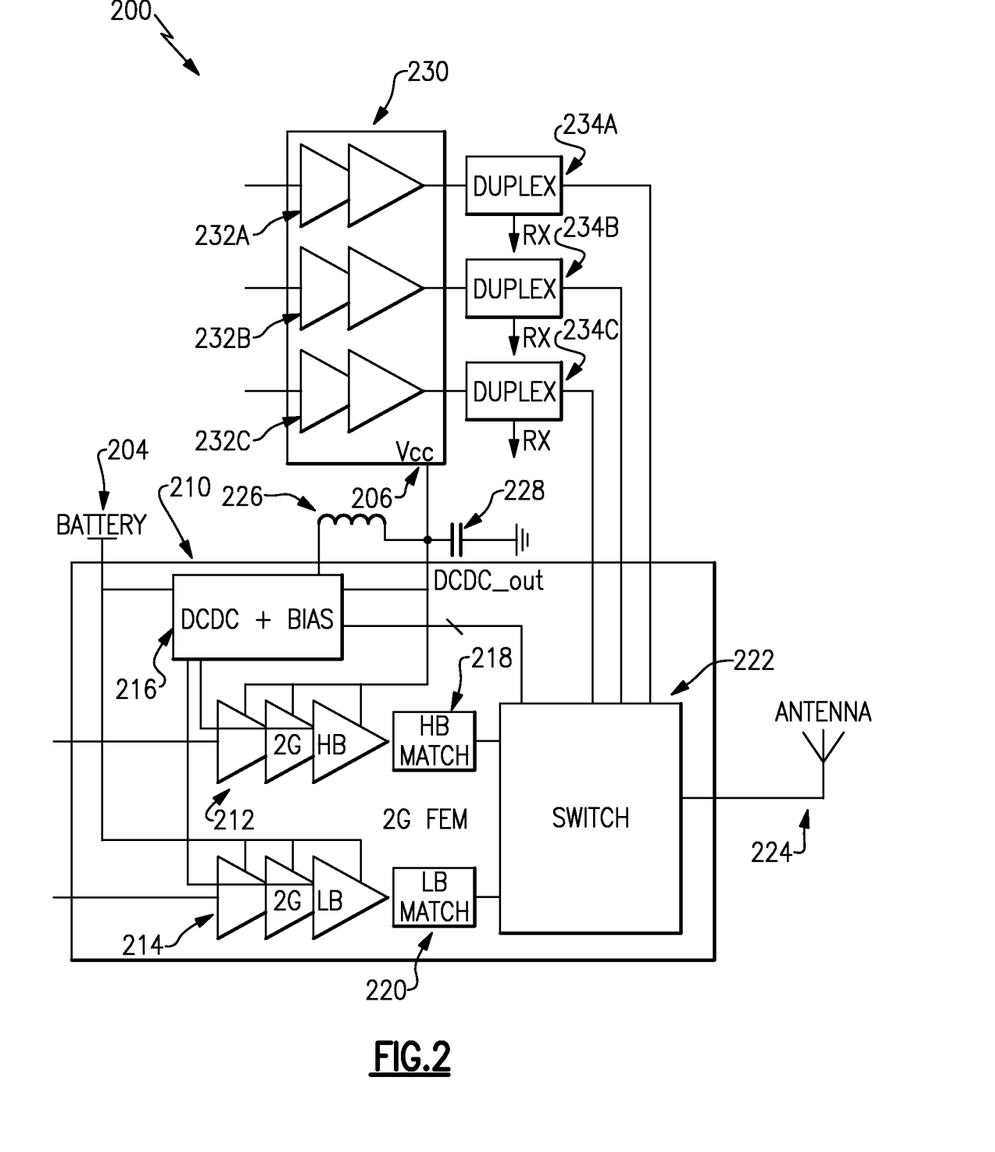
FIG. 2 illustrates a block diagram of an embodiment of a portion of a multi-chip module that includes a pair of front-end modules with a shared integrated DC-DC supply regulator.

FIG. 2 illustrates a block diagram of an embodiment of a portion of a multi-chip module 200 (MCM) that includes a pair of front-end modules with a shared integrated DC-DC supply regulator. The MCM 200 may be included as part of a communications system of a device, which may be a wired or wireless device. It should be understood that the MCM 200 may include a number of additional devices, such as a power amplifier controller and one or more additional filters. However, to simplify discussion and not to limit the disclosure, these additional components have been omitted from FIG. 2.

The MCM 200 may include a FEM 210 and an FEM 230. Although two FEMs are depicted, it is possible for the MCM 200 to include more or fewer FEMs. In some embodiments, the MCM 200 may include a separate FEM for each communications technology supported by a device that includes the MCM 200. In the illustrated example of FIG. 2, the FEM 210 represents a 2G FEM that supports a 2G communications standard. The FEM 230 may be configured to support one or more alternative communications standards or technologies. For example, the FEM 230 may be configured to support 3G and 4G communications. Further, the FEM 230 may support a number of communications bands. For example, the FEM 230 may support six or seven communications bands. In the illustrated example, the FEM 230 supports a number of communications bands via the three power amplifiers 232A, 232B, 232C, which may individually or collectively be referred to as power amplifiers 232. In some cases, each power amplifier 232 supports a different communication band. Alternatively, at least some of the power amplifiers 232 may support multiple communication bands. Thus, although the FEM 230 includes three power amplifiers 232, the FEM 230 may support more than three communication bands.

The FEM 210 includes a combined DC-DC supply regulator (or converter) and bias circuit block 216. To simplify discussion, and not to limit the disclosure, the combined DC-DC supply regulator and bias circuit block 216 will be referred to herein as a DC-DC+bias 216. The DC-DC+bias 216 can provide both the functionality of a DC-DC supply regulator and a bias circuit. Advantageously, in certain embodiments, the DC-DC+bias 216 can be integrated into the FEM 210 with minimal increase in the size of the 2G FEM. In some cases, the die incorporating the DC-DC supply regulator increases in size by less than 20% when the DC-DC supply regulator and bias circuit are combined. This size increase of the DC-DC+bias die may translate to less than a 5% increase in the size of the 2G FEM. In some cases, the discrepancy in the size increase of the DC-DC die is because, in some cases, the inductor and capacitor may be external to the 2G FEM. Further, although the 2G FEM may increase by a small percentage in size, the overall size of the wireless device may be reduced because other FEMs may share the DC-DC supply regulator with the 2G FEM. Moreover, in some embodiments, the DC-DC+bias 216 can be integrated into the FEM 210 without increasing the size of the 2G FEM. Moreover, in some implementations, the DC-DC+bias 216 can be integrated into a 3G or other FEM with little to no increase in the size of the FEM.

Advantageously, by integrating the DC-DC supply regulator with the bias circuit in the FEM 210, the size of the footprint required for the 2G communications circuitry may be reduced. Further, in some implementations, power efficiency may be increased because, for example, power may be supplied to the high band PA 212 by the DC-DC+bias 216. The DC-DC+bias 216 can regulate the supplied power to improve the power efficiency of the high band PA 212. Further, as the low band PA of the 2G FEM typically draws a significant amount of current, the low band PA 214 may be powered directly by the battery 204, or other power source, by placing the lower band PA 214 in electrical communication with the battery without the DC-DC supply regulator.

As illustrated in FIG. 2, the MCM 200 further includes an inductor 226 and a capacitor 228. The inductor 226 and the capacitor 228, although external to the FEM 210, may form part of the DC-DC+bias 216. Thus, the inductor 226 may be referred to as a DC-DC inductor and the capacitor 228 may be referred to as a DC-DC capacitor. The inductor 226 and the capacitor 228 facilitate the conversion of power from the DC-DC supply regulator of the DC-DC+bias 216. Further, as illustrated by the Vcc input 206, the DC-DC+bias 216 provides power to the FEM 230. Thus, advantageously, the integrated DC-DC+bias 216 of the FEM 210 can be used to power the FEM 230 thereby eliminating a separate DC-DC supply regulator for the FEM 230 and further reducing the footprint of the MCM 200.

As previously indicated, the FEM 210 includes a power amplifier 212 and a power amplifier 214. The power amplifier 212 can be configured to support high band 2G operation (e.g., 1800-1900 MHz) and the power amplifier 214 can be configured to support low band 2G operation (e.g., 800-900 MHz). Further, each of the power amplifiers 212, 214 may support multiple communication bands. Although not limited as such, both the power amplifier 212 and the power amplifier 214 may be formed from a set of heterojunction bipolar transistors (HBTs). Similarly, the power amplifiers 232 of the FEM 230 may be formed from a set of HBTs.

The FEM 210 further includes an impedance matching 218 and an impedance matching circuit 220 configured to match the impedance at the output of the power amplifier 212 and the power amplifier 214, respectively, to an impedance of the antenna 224. Typically, the antenna 224 is designed to be at a 50 Ohm impedance. However, it is possible for the antenna 224 to be designed for a different impedance value. Further, in some cases, the impedance of the antenna 224 may vary based on the operation of the wireless device that includes the MCM 200. For instance, the impedance may change based on the distance of the wireless device to a base station or the location of the user's hand in relation to the antenna 224. In such cases, the impedance matching circuits 218 and 220 may be configured to adjust the impedance at the output of the power amplifier 212 and 214, respectively, based on the measured impedance at the antenna 224.

In addition, the FEM 210 includes a switch 222 that is configured to determine which signal should be sourced or provided to the antenna 224. As illustrated in FIG. 2, the switch 222 can receive signals from the FEM 230, via the duplexers 234, as well as from the PAs 212 and 214, via the respective impedance matching circuits 218 and 220. The switch 222 can provide a selected signal to the antenna 224 based on a control signal. In some embodiments, the control signal may be provided by the DCDC+bias 216.

As indicated above, the MCM includes a number of duplexers 234. In some cases, a duplexer 234 may exist for each PA 232 in the FEM 230. For instance, the duplexer 234A may correspond to the PA 232A, the duplexer 234B may correspond to the PA 232B, and the duplexer 234B may correspond to the PA 232B. In some cases, one or more of the duplexers 234 may be shared by one or more of the PAs 232. Further, the duplexers 234 may include one or more filters for filtering the output of the FEM 230.

The power amplifiers of the MCM 200 can include any type of power amplifier. Further, the power amplifiers may be set to operate at a particular operating point. This operating point may be configured by the DCDC+bias 216, which may provide a bias current and/or voltage to one or more of the power amplifiers. In some embodiments, the FEM 230 may include a separate bias circuit for the PAs 232 of the FEM 230.

Although much of the above discussion has been in the context of transmitting a signal, it should be understood that the FEMs 210 and 230 may also be involved in receiving a signal from the antenna 224. For instance, the duplexers 234 may also provide a received signal to a transceiver within a wireless device.

Example Layout of a 2G FEM

Figure 3:
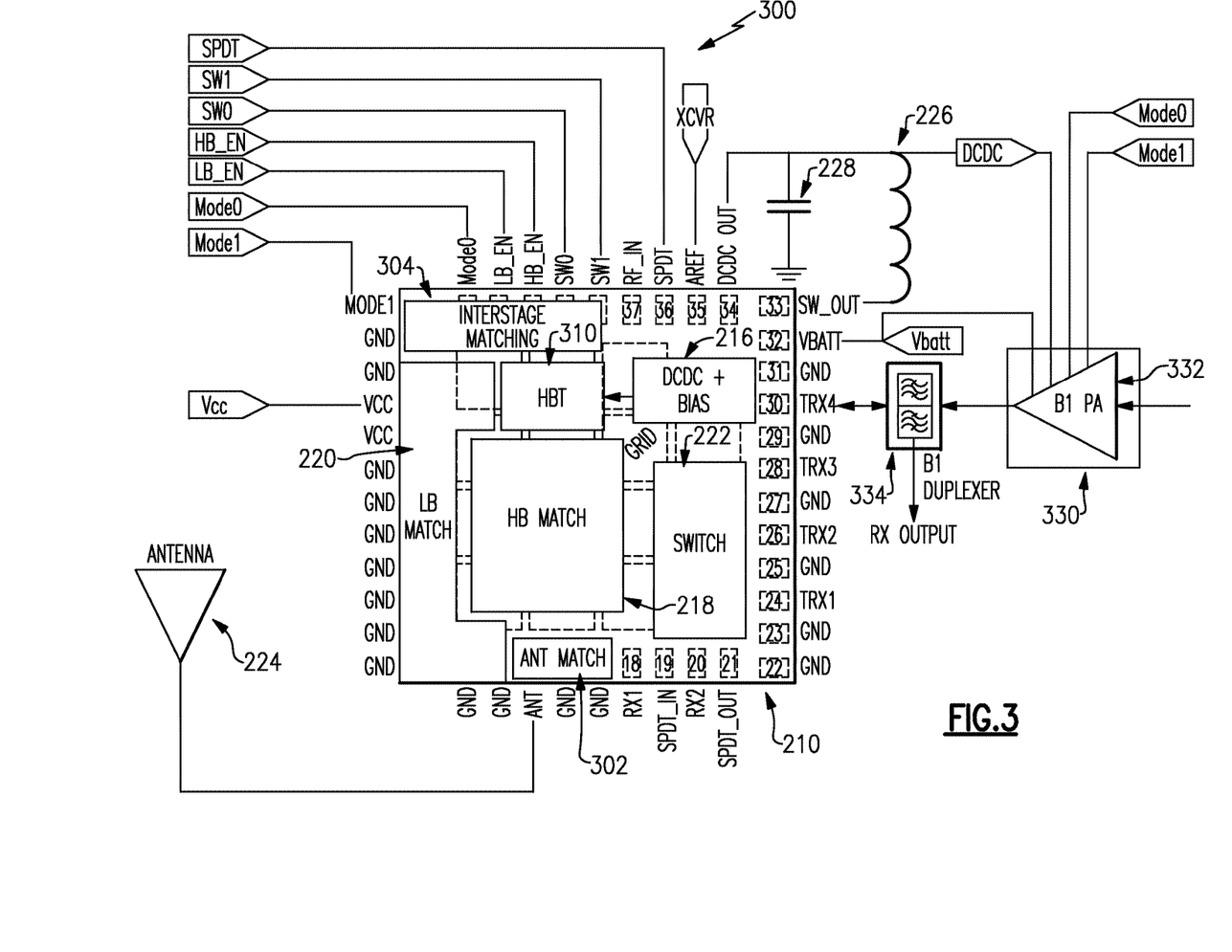
FIG. 3 illustrates a block diagram of an embodiment of a layout of a 2G front-end module with a shared integrated DC-DC supply regulator.

FIG. 3 illustrates a block diagram of an embodiment of a block layout 300 of a 2G front-end module 210 with a shared integrated DC-DC supply regulator 216. In the example illustrated in FIG. 3, the high band PA 212 and the low band PA 214 of FIG. 2 are included in a single block as a multiband PA 310. In addition, the FEM 210 includes a pair of additional impedance matching blocks, antenna impedance matching block 302 and interstage impedance matching block 304.

The antenna impedance matching block 302 may include a circuit for matching the impedance between the antenna 224 and the switch 222. Further, the antenna impedance matching block 302 may be configured to match the impedance both when signals are being transmitted and received. In addition, in some embodiments, the antenna impedance matching block 302 is configured to generate a harmonic match and/or to filter out particular harmonics of the transmit or receive signal. Moreover, the antenna impedance matching block 302 may be configured to protect against electrostatic damage (ESD) that may occur, for example, from human contact with the antenna 224.

The interstage impedance matching block 304 is configured to perform impedance matching between the stages of the power amplifiers of the multiband PA 310. Typically, although not necessarily, the power amplifiers of the multiband PA 310 will include multiple stages, which each contribute to the gain factor of the PAs. Usually, a lower power input is applied to the input of the PA and the PA outputs a signal at a higher power. The applied gain can result in an impedance mismatch between stages of the PA. The interstage impedance matching block 304 can match the impedance between the lower power input stage, the one or more intermediate stages, and the output stage of the PAs included in the multiband PA 310.

The block layout 300 includes a second FEM 330, which is configured to provide a communications band, such as LTE-band 1, other than the 2G bands of the FEM 210. The FEM 330 includes a B1 PA 332 configured to provide gain for the communication signal transmitted or received via the FEM 330. Further, the signal output by the B1 PA 332 is provided to a duplexer 334, which can include one or more filters for the received signal or the signal to be transmitted via the antenna 224.

Example FEM Circuit that Includes an Integrated DC-DC Supply Regulator

Figure 4:
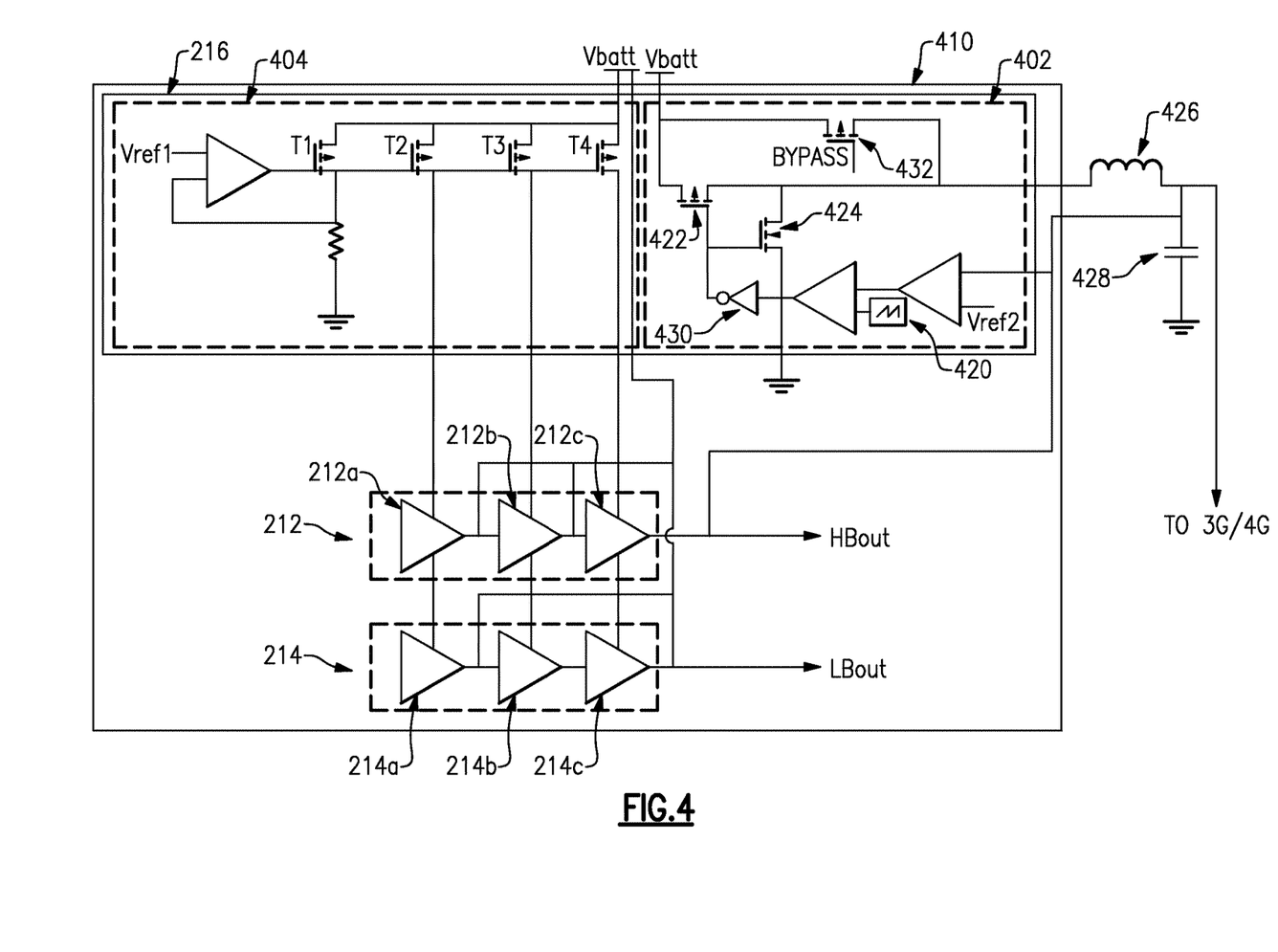
FIG. 4 illustrates a portion of a circuit diagram for a front-end module with an integrated DC-DC supply regulator and power amplifier bias circuit.

FIG. 4 illustrates a portion of a circuit diagram for a front-end module 410 with an integrated DC-DC supply regulator (or converter)+bias block 216 that includes a power amplifier bias circuit 402. The integrated DC-DC supply regulator 216 includes a DC-DC supply regulator 402 in addition to the power amplifier bias circuit 404. The front-end module 410 may include some or all of the features and components illustrated and described with respect to the FEM 210. These additional features and components have been omitted from the FEM 410 to simplify the diagram and not to further limit the design.

The FEM 410 is a 2G FEM that supports multiple frequency bands with the inclusion of multiple power amplifiers. Although FIG. 4 illustrates a 2G FEM, certain embodiments of the FEM 410 may also be applicable for FEMs that support other communication technologies, such as 3G, 4G LTE, or 5G. The FEM 410 may include a low band (or LB) PA 214 and a high band (or HB) PA 212. In some embodiments, the HB PA 212 may also support mid band (or MB) operation.

Both the LB PA 214 and the HB PA 212 are illustrated as three-stage PAs. However, the power amplifiers are not limited as such and may include fewer stages, such as two stages, or a greater number of stages, such as four stages or any other number of stages. Typically, the low band PA 214 tends to have a higher upper power requirement compared to the HB PA 212. For example, in some cases, the upper power requirement of the LB PA 214 can be up to 3 dB higher than that of the HB PA 212. Thus, as illustrated in FIG. 4, each stage of the LB PA 214 is supplied its power by the power supply input (e.g., Vbatt) to the FEM 410. This is illustrated in FIG. 4 by the line that connects the Vbatt to the output of each transistor stage 214A, 214b, and 214c in the LB PA 214. In contrast, while the first two stages 212a and 212b of the HB PA 212 receive power directly from Vbatt, the output stage 212c can draw its power from the output of the DCDC+bias 216. In some cases, the voltage supplied by the Vbatt may be about 3.8 volts. However, in certain implementations, the Vbatt may have a different voltage value or voltage range.

The bias circuit 404 of the DC-DC+bias 216 can supply a reference current to bias each transistor of the amplifiers that make up the HB and/or MB PA 212 and the LB PA 214. This bias circuit 404 may be integrated onto the same die as the DC-DC supply regulator 402, which together forms the DC-DC+bias 216. This DC-DC+bias 216 may itself be combined with other features, such as a PA, of the FEM 410 on a single die or may be a separate die that is included as part of the FEM 410.

As illustrated, the bias circuit 404 may receive a reference voltage Vref1. This reference voltage may be an external analog voltage provided to the system by, for example, a cellular radio, or may be generated by an integrated data converter that generates the reference voltage based on a digital interface. The reference voltage Vref1 may be provided to an operational amplifier in a feedback loop with a first transistor T1, which creates a voltage to current converter. The current may then be supplied by the transistors T2, T3, and T4 to the transistor stages of the PAs. For instance, the transistor T2 may supply the bias current to the first stage 212a and 214a of the PAs 212 and 214, respectively. Similarly, the transistor T3 may supply the bias current to the second stage 212b and 214b of the PAs 212 and 214, respectively, and the transistor T4 may supply the bias current to the output stage 212c and 214c of the PAs 212 and 214, respectively. One or more of the transistors T1, T2, T3, and T4 may be pFETs. However, the transistors are not limited as such and may include other types of transistors, such as nFETs, BJTs, or HBTs.

In certain embodiments, one or more of the transistors T2, T3, and T4 may supply a different current to one or more of the respective transistor stages of one or more of the PAs 212 and 214. For example, the transistor T4 may supply a larger bias current to the output stages 212c and 214c than the transistor T2 may supply to the input stages 212a and 214a of the PAs 212 and 214. In some cases, the bias current supplied to one stage of the PAs 212 and 214 may be a multiple of the bias current supplied to another stage. For instance, the output stages of the PAs 212 and 214 may receive three time the bias current of the input stages to the PAs 212 and 214. Moreover, in certain embodiments, one or more stages of the PA 212 may receive a different bias current than the corresponding stage from the PA 214. In other words, the first stage 212a may receive a different bias current than the first stage 214a.

The DC-DC supply regulator 402 integrated into the FEM 410, which can be a 2G FEM, may supply power to PAs that are external to the FEM 410, such as to one or more PAs that support 3G or 4G operation by a wireless device. This provisioning of power to external devices is illustrated the "To 3G/4G" output of the FEM 410. Although the output line addresses 3G or 4G, it should be understood that the disclosure is not limited as such and that the DC-DC supply regulator 402 of the FEM 410 may supply power to PAs that support other types of wireless operation, such as 5G. Advantageously, the design of FIG. 4 enables multiple PAs supporting different wireless communication standards and/or frequency bands to share a single DC-DC supply regulator 402, which may result in cheaper and smaller devices because, for instance, the number of DC-DC supply regulators for a wireless device may be reduced.

Generally, each stage of a high band PA included in a 2G supporting FEM is supplied power by Vbatt. This is often the case because the low band PA due to its relatively high power requirements needs to draw its power from Vbatt. As illustrated in FIG. 4, by integrating the DC-DC supply regulator 402 into the FEM 410, the output stage 212c of the HB PA 212 can draw power from the DC-DC supply regulator 402. Typically, the output stage 212c may be supplied the same power that is output to the 3G/4G (or other supported communication technologies) power amplifiers. By supplying power to the HB PA 212 from the DC-DC supply regulator 402 instead of from Vbatt, as may occur in certain other FEMs, the efficiency of the HB PA 212 can be improved.

As with the bias circuit 404, the DC-DC supply regulator 402 may receive a reference voltage Vref2. Generally, the reference voltage Vref2 is a separate reference voltage from the reference voltage Vref1 received by the bias circuit 404. However, in certain embodiments, although the Vref1 and Vref2 voltages may be separate reference voltages received from separate sources, they may share the same voltage value. Moreover, in some embodiments, both the Vref1 and Vref2 may be received from the same source. In some such cases, the Vref1 and Vref2 may be received at the same pin of the FEM 410.

The reference voltage Vref2 received at the DC-DC supply regulator 402 may be used to configure the supply voltage received by the DC-DC supply regulator 402. Typically, this reference voltage Vref2 is independent from the bias circuit 404 and is not involved in configuring or providing a bias current to the PAs 212 and 214.

In addition to the reference voltage Vref2, the DC-DC supply regulator 402 receives a clock signal 420. As illustrated in FIG. 4, this clock signal 420 may be a saw tooth signal. Further, the clock signal 420 may be a pulse width modulated signal. The clock signal 420 may create shorter or longer pulses based on the current DC level. These pulse widths will effectively turn on and off the switches represented by the transistors 422 and 424 for different durations to vary the voltage that is output from the DC-DC supply regulator 402 across the inductor 426. As previously described, the output signal may be provided to other FEMs, such as a 3G or 4G FEM, and/or to the output stage of the HB PA 212 of the FEM 410. Further, the varying pulse widths of the clock signal 420 may alter the duty cycle of the DC-DC supply regulator 402, which can result in the output voltage being adjusted to bring it closer to the target voltage which may be determined based at least in part on the reference voltage Vref2.

The inverter 430 can provide a control signal to the transistors 422 and 424 that may be based on the received reference signal Vref2 and the clock signal 420. Based on this control signal, the transistors 422 and 424 can be turned on or off, thereby switching the inductor 426 between Vbatt and ground.

In certain cases, the target voltage may be at or near the Vbatt voltage. When these cases occur, it can be inefficient to use the DC-DC supply regulator 402 to adjust the voltage output by the FEM 410 to trying and satisfy the desired target voltage. Thus, in some such cases, the DC-DC supply regulator 402, or its functionality, may be deactivated, and the Vbatt may be supplied or shorted via a bypass transistor 432 to the output through the inductor 426. Advantageously, in certain embodiments, by providing Vbatt to the output via the inductor 426 when the target voltage is close (e.g., within a threshold voltage difference) to the Vbatt, the energy required to operate the DC-DC supply regulator 402 functionality may be reduced thereby increasing battery life for a wireless device that incorporates the DC-DC supply regulator 402.

Additional Wireless Device Examples

Figure 5:
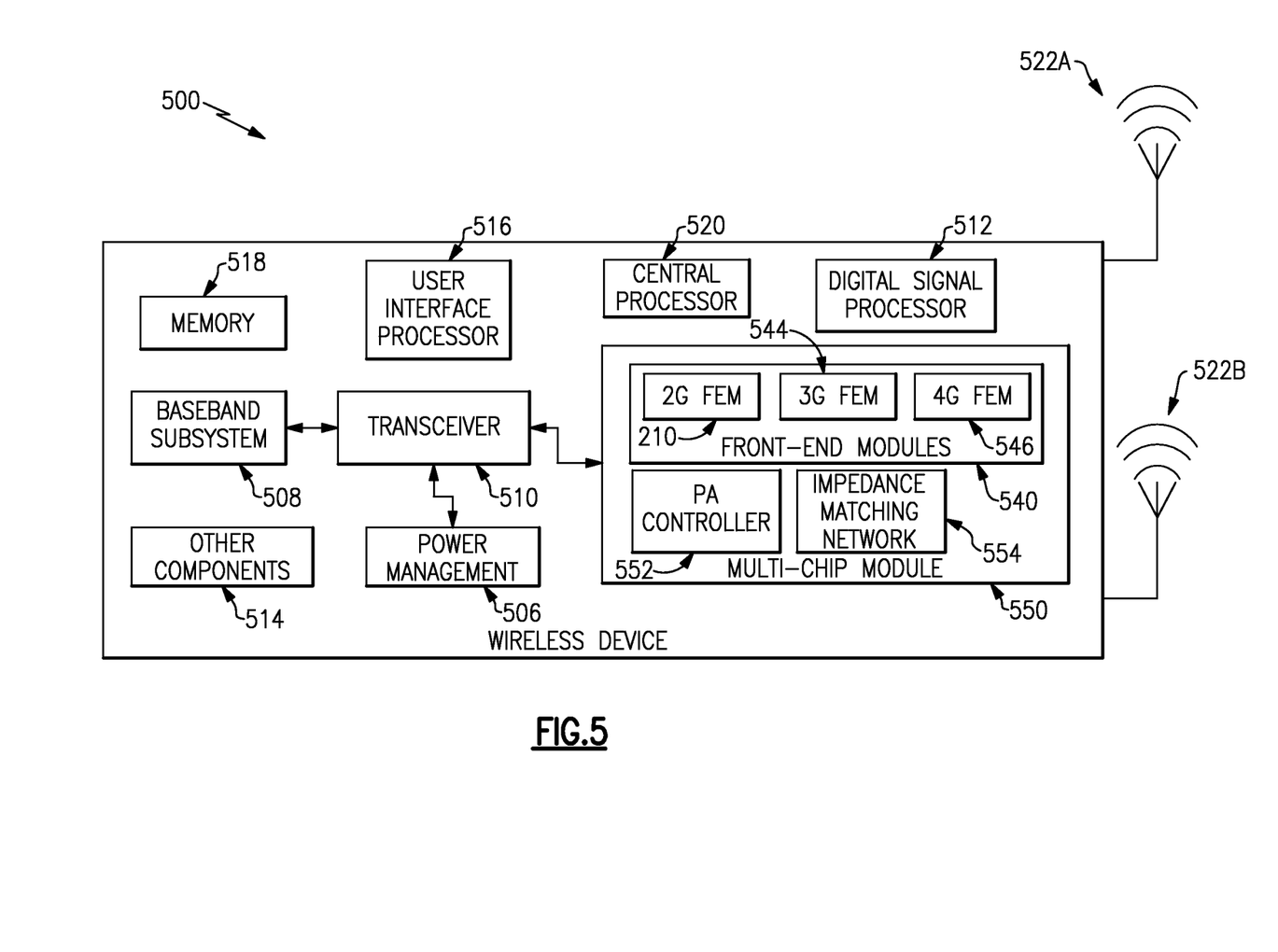
FIG. 5 illustrates a block diagram of a wireless device including a number of front-end modules.

FIG. 5 illustrates a block diagram of a wireless device 500 including multi-chip module 550 with a number of front-end modules 540. The multi-chip module 550 can include the MCM 200. Further, the MCM 550 can include one or more of the embodiments described above with respect to the MCM 200 and/or the block layout 300.

In the example illustrated in FIG. 5, the FEMs 540 includes three FEMs, a 2G FEM 210, a 3G FEM 544, and a 4G FEM 546. In some implementations, one or more of the FEMs may be combined. For example, the 3G FEM 544 and the 4G FEM 546 may be combined into a single FEM 230 as illustrated in FIG. 2. Further, the FEMs 540 may include more or fewer FEMs than illustrated. As previously described, the 2G FEM 210 can include a DC-DC supply regulator, which may be integrated with the bias circuit of the 2G FEM. This DC-DC supply regulator may be shared with the 3G FEM 544 and the 4G FEM 546 thereby enabling a reduction in the size of the FEMs 540.

In addition to the FEMs 540, the MCM 550 may include a number of additional systems configured to facilitate operation of the PAs included in the FEMs 540. For example, the MCM 550 may include a PA controller 552 configured to set the mode of one or more PAs included in the FEMs 540. Further, the PA controller 552 may configure the switch 222 of the 2G FEM 210 to select a signal for transmission from one of the FEMs 540 or from a particular band supported by one of the FEMs 540, such as a low band transmission by the 2G FEM 210 or a 4G signal from the 4G FEM 546.

In some embodiments, the PA controller 552 may set the operating point for a PA included in a FEM 540 by modifying a bias circuit, such as the DCDC+bias 216. For instance, the PA controller 552 may set or modify a bias current provided by the DCDC+bias 216 to the PA 212 of FIG. 2.

In addition, the MCM 550 may include one or more impedance matching networks 554 configured to match one or more impedance values between one or more circuits in a load line. For instance, the impedance matching network 554 may be configured to match an impedance between the antenna 522A and the FEMs 540.

In some cases, the MCM 550 can receive RF signals from a transceiver 510 that can be configured and operated in known manners to generate RF signals to be amplified and transmitted, and to process received signals. The transceiver 510 is shown to interact with a baseband subsystem 508 that is configured to provide conversion between data and/or voice signals suitable for a user and RF signals suitable for the transceiver 510. The transceiver 510 may also be connected to a power management component 506 that is configured to manage power for the operation of the wireless device. Such power management can also control operations of the baseband sub-system 508 and the MCM 550. It should also be understood that the power management component 506 may include a power supply, such as a battery. Alternatively, or in addition, one or more batteries may be separate components within the wireless device 500.

Other connections between the various components of the wireless device 500 are possible, and are omitted from FIG. 5 for clarity of illustration only and not to limit the disclosure. For example, the power management component 506 may be electrically connected to the baseband subsystem 508, the MCM 550, the DSP 512, or other components 514. As a second example, the baseband subsystem 508 may be connected to a user interface processor 516 that may facilitate input and output of voice and/or data provided to and received from the user. The baseband sub-system 508 can also be connected to a memory 518 that may be configured to store data and/or instructions to facilitate the operation of the wireless device 500, and/or to provide storage of information for the user.

In addition to the aforementioned components, the wireless device may include one or more central processors 520. Each central processor 520 may include one or more processor cores. Further, the wireless device 500 may include one or more antennas 522A, 522B. In some cases, one or more of the antennas of the wireless device 500 may be configured to transmit and receive at different frequencies or within different frequency ranges. Further, one or more of the antennas may be configured to work with different wireless networks. Thus, for example, the antenna 522A may be configured to transmit and receive signals over a 2G network, and the antenna 522B may be configured to transmit and receive signals over a 3G network. In some cases, the antennas 522A and 522B may both be configured to transmit and receive signals over, for example, a 2.5G network, but at different frequencies.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS. Further, the wireless device 500 may include any number of additional components, such as analog to digital converters, digital to analog converters, graphics processing units, solid state drives, etc. Moreover, the wireless device 500 can include any type of device that may communicate over one or more wireless networks and that may include a number of FEMs 540 which may share an integrated DC-DC supply regulator. For example, the wireless device 500 may be a cellular phone, including a smartphone or a dumbphone, a tablet, a laptop, a video game device, a smart appliance, etc.

Figure 6:
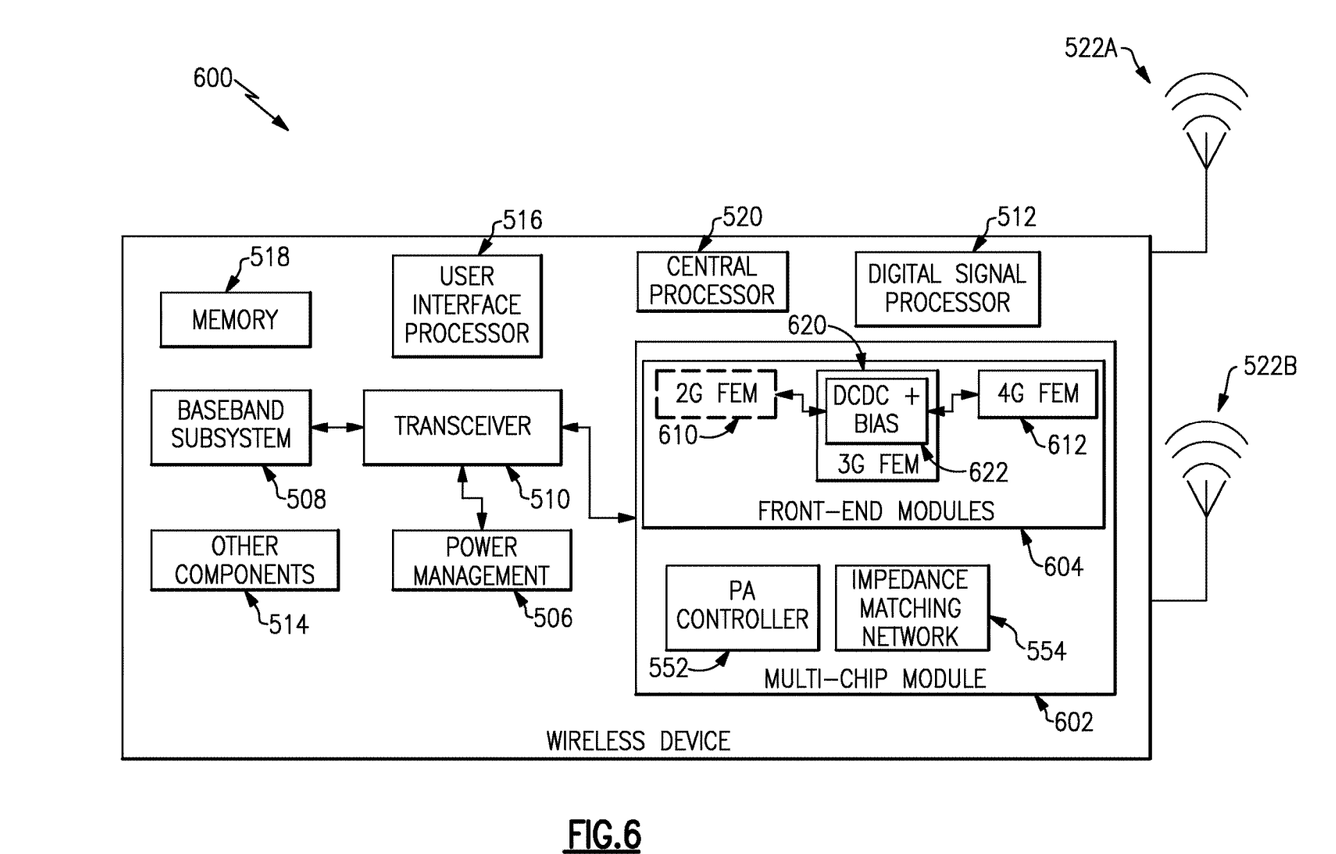
FIG. 6 illustrates a block diagram of a wireless device including a number of front-end modules that share a DC-DC supply regulator integrated in a 3G front-end module.

FIG. 6 illustrates a block diagram of another wireless device 600 including a number of front-end modules 604 that share a DC-DC supply regulator integrated in a 3G front-end module 620. The wireless device 600 includes a number of the same elements as the wireless device 500. Further, as illustrated in FIG. 6, the FEMs 604 of the wireless device 600 may include a number of FEMs. The FEMs 604 may include a 2G FEM 610, a 3G FEM 620, and a 4G FEM 612. In the illustrated example, the 3G FEM 620 may include a DCDC+Bias block 622, which may include a combined DC-DC supply regulator and a bias circuit for supplying a bias current to one or more power amplifiers included by the FEMs 604. The DCDC+Bias 622 may be in electrical communication with the 2G FEM 610 and the 4G FEM 612.

As illustrated by the dashed lines, the 2G FEM 610 may be optional in some embodiments. In such cases, the DCDC+Bias 622 may be shared between the 3G GEM 620 and the 4G FEM 612.

Terminology

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The term "coupled" is used to refer to the connection between two elements, the term refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the inventions are not intended to be exhaustive or to limit the inventions to the precise form disclosed above. While specific embodiments of, and examples for, the inventions are described above for illustrative purposes, various equivalent modifications are possible within the scope of the inventions, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the inventions provided herein can be applied to other systems, not necessarily the system described above. The elements and acts of the various embodiments described above can be combined to provide further embodiments.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A front-end module for use in a wireless device, the front-end module comprising:
    an integrated circuit die having a plurality of signal pins including one or more radio frequency transmit signal pins, one or more radio frequency receive signal pins, and a regulated supply output pin;
    a first power amplifier on the integrated circuit die of the front-end module, the first power amplifier one of a plurality of power amplifiers within the front-end module and which are located on the integrated circuit die; and
    an integrated DC-DC converter circuit with at least a portion within the front-end module, located on the integrated circuit die, and configured to regulate a first supply voltage, the regulated first supply voltage provided to the first power amplifier, the integrated DC-DC converter circuit further configured to regulate a second supply voltage, the regulated second supply voltage provided to a second power amplifier via the regulated supply output pin, the second power amplifier located on a second integrated circuit die of a second front end module, the second integrated circuit die separate from the integrated circuit die and external to the front-end module, and the integrated DC-DC converter circuit including a capacitor and an inductor external to the front-end module; and
    a bias circuit within the front-end module and combined with the integrated DC-DC converter circuit located on the integrated circuit die, the bias circuit configured to supply a bias current to the first power amplifier.

2. The front-end module of claim 1 wherein the front-end module is configured for 2G communication and the second power amplifier is included in a different front-end module than the first power amplifier, the different front-end module configured for non-2G communication.

3. The front-end module of claim 1 further comprising a switch configured to supply a signal from one of the first power amplifier and the second power amplifier to an antenna.

4. The front-end module of claim 1 further comprising a third power amplifier that receives a third supply voltage, the third supply voltage received from a power source and not the DC-DC converter circuit, the third power amplifier configured to provide low band 2G communication, the first power amplifier configured to provide high band 2G communication.

5. The front-end module of claim 1 wherein the integrated DC-DC converter circuit regulates the first supply voltage and the second supply voltage based on a voltage received from a power source.

6. The front-end module of claim 1 further comprising one or more impedance matching networks configured to match an impedance value of the first power amplifier to an impedance value of an antenna.

7. A multi-chip module comprising:
    a first front-end module implemented on a first integrated circuit die having a plurality of signal pins including one or more radio frequency transmit signal pins, one or more radio frequency receive signal pins, and a regulated supply output pin, the first front-end module including a first power amplifier, at least a portion of an integrated DC-DC converter circuit configured to regulate a first supply voltage, and a bias circuit within the front-end module and combined with the integrated DC-DC converter circuit, the bias circuit configured to supply a bias current to the first power amplifier, the regulated first supply voltage provided to the first power amplifier, the first power amplifier one of a plurality of power amplifiers within the front-end module, and the integrated DC-DC converter circuit including a capacitor and an inductor external to the front-end module; and
    a second front-end module implemented on a second integrated circuit die that is separate from the first integrated circuit die and includes a second power amplifier, the second power amplifier configured to receive a second regulated supply voltage provided by the integrated DC-DC converter circuit of the first front-end module implemented on the first integrated circuit die via the regulated supply output pin of the first integrated circuit die.

8. The multi-chip module of claim 7 wherein the first front-end module is configured for 2G communication and the second front-end module is configured for non-2G communication.

9. The multi-chip module of claim 7 wherein the first front-end module further includes a switch configured to supply a signal from one of the first power amplifier and the second power amplifier to an antenna.

10. The multi-chip module of claim 7 wherein the first front-end module includes a third power amplifier that receives a supply voltage from a source other than the integrated DC-DC converter circuit, the first power amplifier configured to provide high band 2G communication and the third power amplifier configured to provide low band 2G communication.

11. The multi-chip module of claim 7 wherein the integrated DC-DC converter circuit regulates the first supply voltage and the second supply voltage based on a voltage received from a power source.

12. The multi-chip module of claim 7 wherein the first front-end module further includes one or more impedance matching networks configured to match an impedance value of the first power amplifier to an impedance value of an antenna.

13. A wireless device comprising:
a multi-chip module including a first front-end module implemented on a first integrated circuit die and a second front-end module implemented on a second integrated circuit die, at least the first integrated circuit die having a plurality of signal pins including one or more radio frequency transmit signal pins, one or more radio frequency receive signal pins, and a regulated supply output pin, the first front-end module including a first power amplifier, at least a portion of an integrated DC-DC converter circuit configured to regulate a first supply voltage, and a bias circuit within the front-end module and combined with the integrated DC-DC converter circuit, the bias circuit configured to supply a bias current to the first power amplifier, the regulated first supply voltage provided to the first power amplifier, the first power amplifier one of a plurality of power amplifiers within the front-end module, the integrated DC-DC converter circuit including a capacitor and an inductor external to the front-end module, and the second front-end module including a second power amplifier, the second power amplifier configured to receive a second regulated supply voltage provided by the integrated DC-DC converter circuit of the first integrated circuit die via the regulated supply output pin of the first integrated circuit die; and
an antenna configured to provide a signal and/or receive a signal from the multi-chip module.

14. The wireless device of claim 13 wherein the first front-end module further includes a switch configured to supply a signal from one of the first power amplifier and the second power amplifier to the antenna.

15. The wireless device of claim 13 wherein the first front-end module includes a third power amplifier that receives a supply voltage from a source other than the integrated DC-DC converter circuit, the first power amplifier configured to provide high band 2G communication and the third power amplifier configured to provide low band 2G communication.

16. The wireless device of claim 13 further comprising a power source, the integrated DC-DC converter circuit further configured to regulate the first supply voltage and the second supply voltage based on a voltage received from the power source.

17. The wireless device of claim 13 wherein the first front-end module is configured for 2G communication and the second front-end module is configured for non-2G communication.

18. The wireless device of claim 13 wherein the first front-end module further includes one or more impedance matching networks configured to match an impedance value of the first power amplifier to an impedance value of the antenna.

* * * * *